United States Patent [19]
Labedz

[11] Patent Number: 5,852,778
[45] Date of Patent: *Dec. 22, 1998

[54] METHOD AND SYSTEM FOR PROVIDING COMMUNICATIONS SERVICE TO A COVERAGE HOLE

[75] Inventor: Gerald Paul Labedz, Chicago, Ill.

[73] Assignee: Motorola, Inc., Schaumburg, Ill.

[ * ] Notice: The term of this patent shall not extend beyond the expiration date of Pat. No. 5,570,343.

[21] Appl. No.: 797,012

[22] Filed: Feb. 7, 1997

Related U.S. Application Data

[63] Continuation of Ser. No. 421,012, Apr. 12, 1995, abandoned.

[51] Int. Cl.$^6$ .................................................. H04Q 7/36
[52] U.S. Cl. ...................... 455/423; 455/67.1; 455/507; 455/524; 375/200; 375/206
[58] Field of Search .................................. 455/33.1, 422, 455/423, 33.4, 442, 56.1, 524, 67.1, 67.3, 8, 9, 53.1, 507, 33.3, 562, 33.2, 63; 379/59; 370/13, 241, 18, 320, 335; 375/200, 206

[56] References Cited

U.S. PATENT DOCUMENTS

| | | | |
|---|---|---|---|
| 4,435,840 | 3/1984 | Kojima et al. | 455/33.4 |
| 5,023,900 | 6/1991 | Tayloe et al. | 379/32 |
| 5,428,817 | 6/1995 | Yahagi | 455/33.3 |
| 5,475,870 | 12/1995 | Weaver et al. | 455/67.1 |
| 5,504,937 | 4/1996 | Kangas | 455/33.3 |
| 5,513,379 | 4/1996 | Benveniste et al. | 455/33.1 |
| 5,570,343 | 10/1996 | Bishop et al. | 370/16 |

*Primary Examiner*—Wellington Chin
*Assistant Examiner*—Lee Nguyen
*Attorney, Agent, or Firm*—Kenneth A. Haas

[57] ABSTRACT

Providing communications service to a coverage hole (22) in a DS-CDMA cellular communication system (50) involves an OMC (52) determining the transmitters (134–144) in adjacent cells (122–132) to the coverage hole (22). The OMC (52) places each of the transmitters (134–144) in the adjacent cells (122–132) in a power on demand mode (92). The OMC (52) then selects at least one, but less than all of the transmitters (134–144) to increase power to a pilot channel. The selected transmitter(s) is chosen base on one or more of the following factors, the transmitter's level of unused power, the interference level at the transmitter and the position of the transmitter.

9 Claims, 6 Drawing Sheets

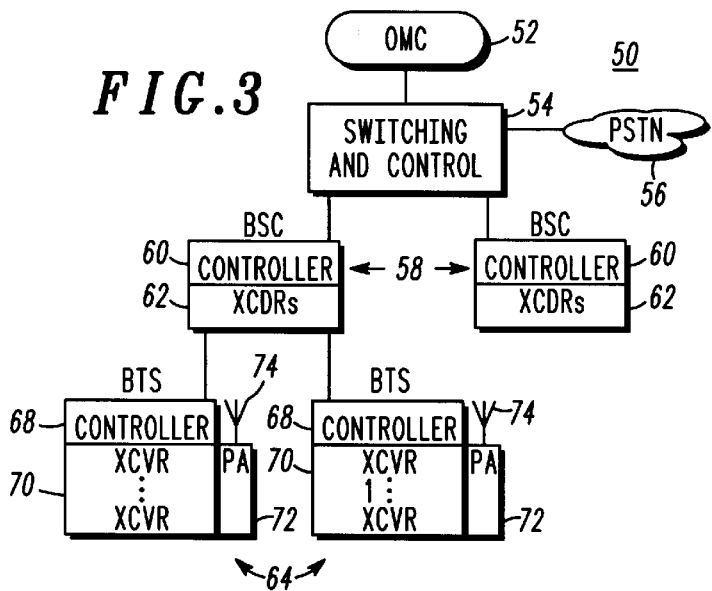
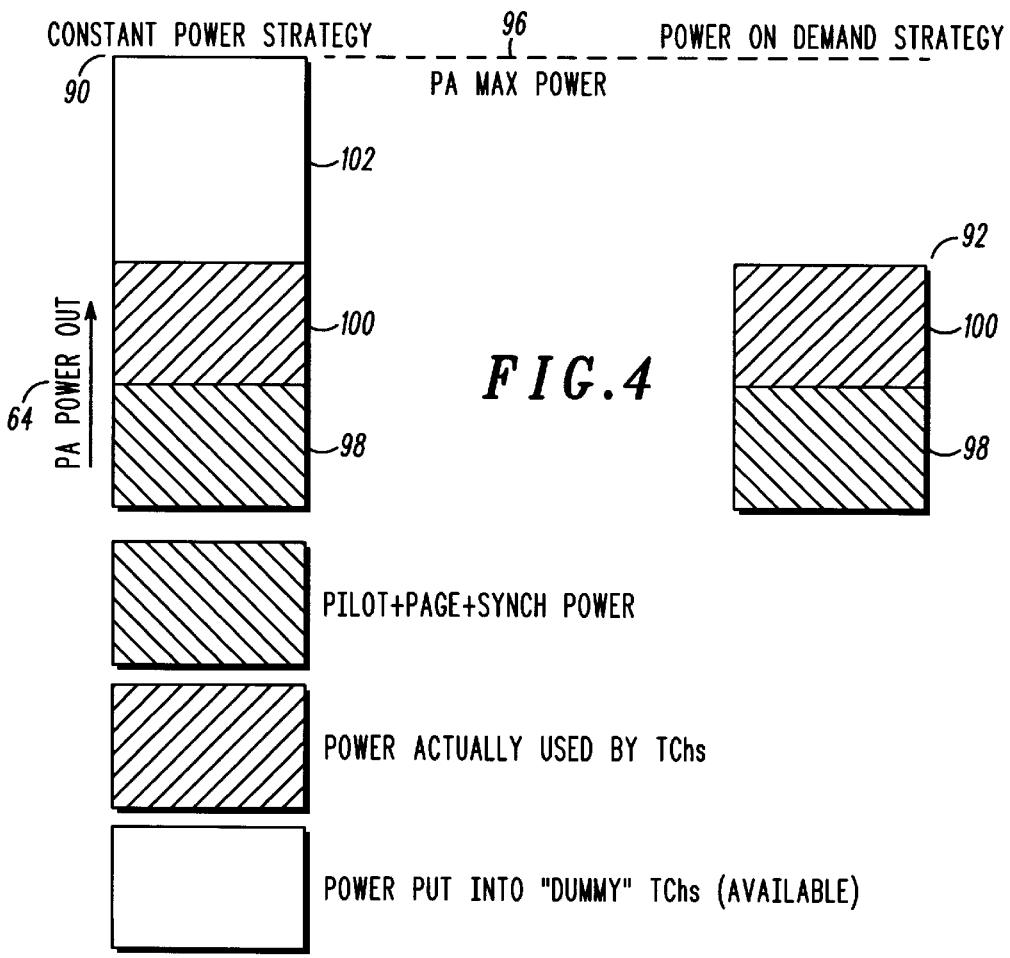

METHOD AND SYSTEM FOR PROVIDING COMMUNICATIONS SERVICE TO A COVERAGE HOLE

This is a continuation of application Ser. No. 08/421,012, filed Apr. 12, 1995 and now abandoned.

FIELD OF THE INVENTION

The present application relates generally to the field of communication systems and more particularly to a method and system for providing communication service to a coverage hole.

BACKGROUND OF THE INVENTION

Cellular communication systems are generally designed to have redundant components to insure communication service is not lost when a component fails. This redundancy requires and an extra transceiver for every active transceiver, and extra power amplifier for every active amplifier, an extra controller for every active controller and all these extra (redundant) components greatly increase the cost of a cellular communication system. Under the present system when a transmitter or power amplifier fails the redundant transmitter is used until the failed transmitter can be fixed. The redundancy also increases the amount of maintenance and repair costs. Both the active and the redundant transmitter requires periodic calibration and maintenance. If the redundancy requirements could be reduced in a cellular communication system, it would significantly lower the cellular operator's cost of business.

One concept that has been proposed as a solution in direct sequence code division multiple access (DS-CDMA) cellular communication system is cell breathing. The idea of cell breathing is when a transmitter (power amplifier) fails at a particular cell the adjacent cells will expand to fill in the coverage gap. Thus, there would be no need for a redundant transmitter or power amplifier. The adjacent cells would fill the coverage gap until the failed transmitter (power amplifier) can be repaired. The solution does result in increased interference in the adjacent cells until the transmitter can be repaired. Simulations show that the adjacent cells will expand when a cell transmitter fails, but not enough to eliminate the coverage gap. FIG. 1 shows a simulation of a DS-CDMA cellular communication system 10. The "X"s 12 are base sites with omnidirectional transmitters. The "o"s 14 are active mobiles (portables, subscriber units). The simulator has randomly place the mobiles 14 in the cellular system 10. The lines 16 define the cell boundaries and are lines of constant energy per chip ($E_c$) divided by total interference energy ($I_o$) or ($E_c/I_o$) that would be detected by a mobile at that spot. The cell boundaries 16 overlap 18 to form areas of soft handoff. FIG. 2 shows what happens if the transmitter for the center base station 20 fails. As can be seen from FIG. 2, a coverage gap 22 exists around the center base station 20. The coverage gap 22 exists even though the surrounding cells' boundaries 16 have expanded.

The obvious solution to the coverage gap 22 left by the failed transmitter is to increase the power of the transmitters of the adjacent cells. This solution results in increasing the self interference from all the adjacent cell transmitters and does not close the coverage gap 12.

Thus there exists a need for a method and system that can provide communication service to a coverage gap and thereby eliminate the need for duplicate transmitters in a cellular communication system.

BRIEF DESCRIPTION OF THE DRAWINGS

FIG. 3 is a block diagram of a cellular communication system;

FIG. 4 is a chart showing two transmitter power strategies in a DS-CDMA cellular communication system;

DETAILED DESCRIPTION OF THE DRAWINGS

The invention supplies a method and system to provide communication for a coverage gap in DS-CDMA cellular communication system. This eliminates the need for duplicate transmitters, reducing both acquisition costs and maintenance costs for a DS-CDMA cellular communication system.

Figure 1:
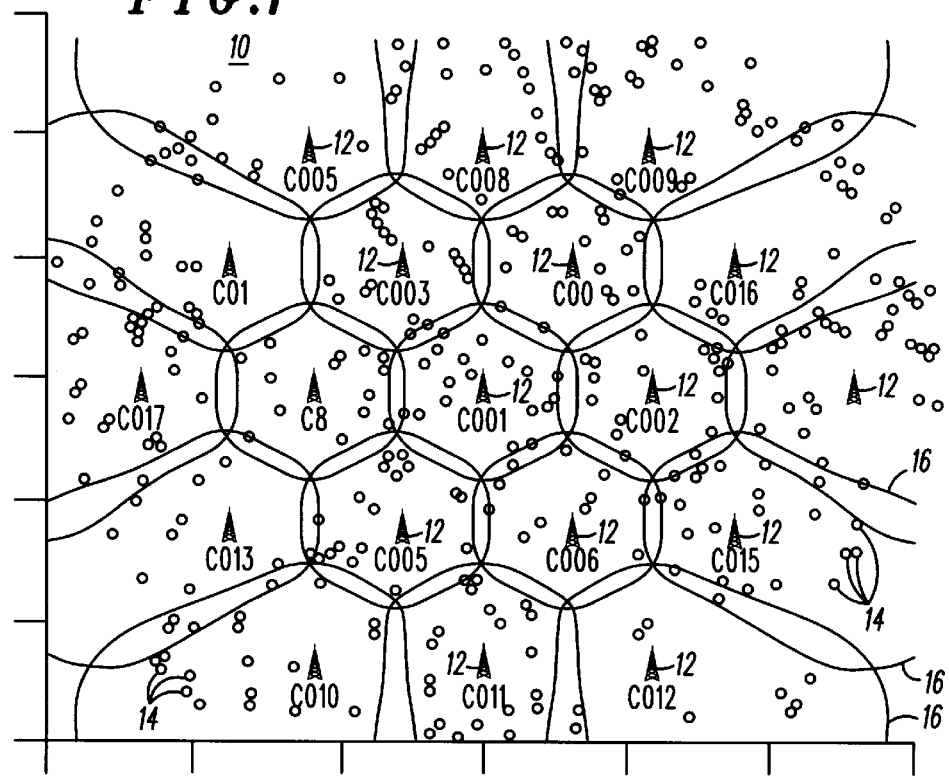
FIG. 1 is a schematic drawing of a direct sequence code division multiple access (DS-CDMA) cellular communication system.

FIG. 3 shows a block diagram of a typical cellular communication system 50. An operations and maintenance center (OMC) 52 monitors and controls all aspects of the cellular communications system. The OMC 52 is connected to the other parts of the cellular communication system 50 through a switch and control (routing) system 54. The switching and control system 54 is also connected to the public switch telephone network (PSTN) 56 and a plurality of base site controllers (BSC) 58. The BSCs 58 has a controller 60 and a plurality of transcoders (XCDR) 62. Each BSC 58 is coupled to a plurality of base site transceivers (BTS) 64. The BTS 64 is generally located in the center of a cell and corresponds to the "X"s 12 of FIG. 1. The BTSs 64 have a controller 68, a plurality of transceivers (transmitters and receivers) 70, a power amplifier (PA) 72 and an antenna 74. The OMC 52 is constantly monitoring the BTSs 64 and the BTSs 64 are constantly reporting a wide variety of information to the OMC 52, including if a transmitter 70 or power amplifier 72 have failed.

Figure 2:
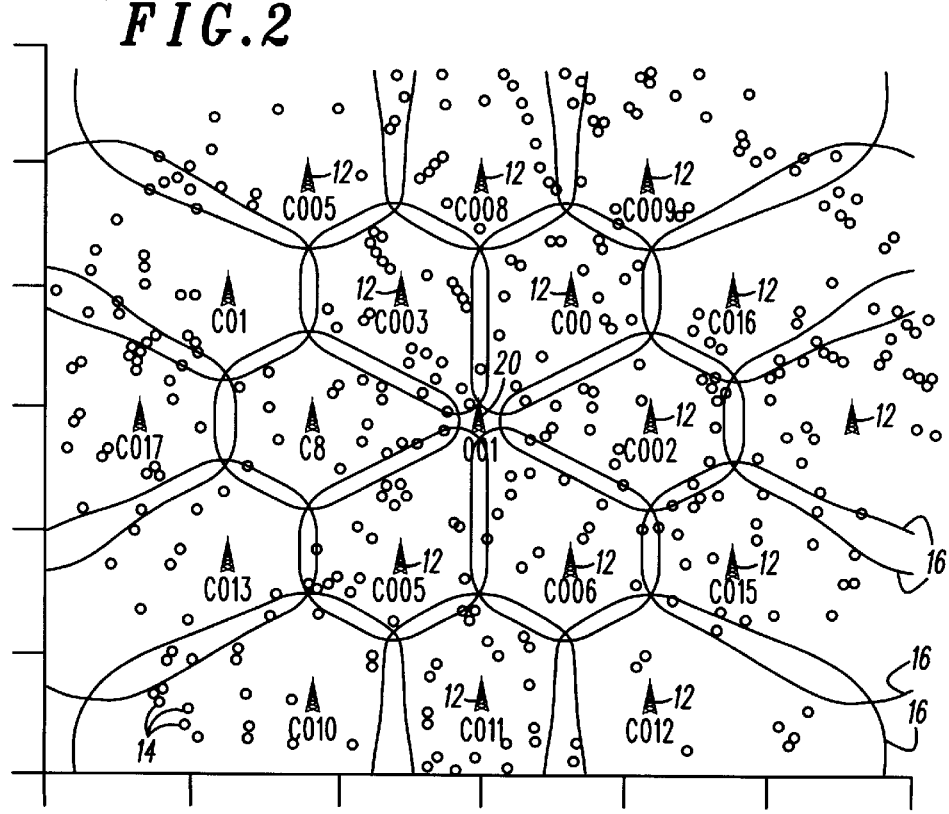
FIG. 2 is a schematic drawing of a direct sequence code division multiple access (DS-CDMA) cellular communication system where the transmitter of the center cell has failed.
Figure 5:
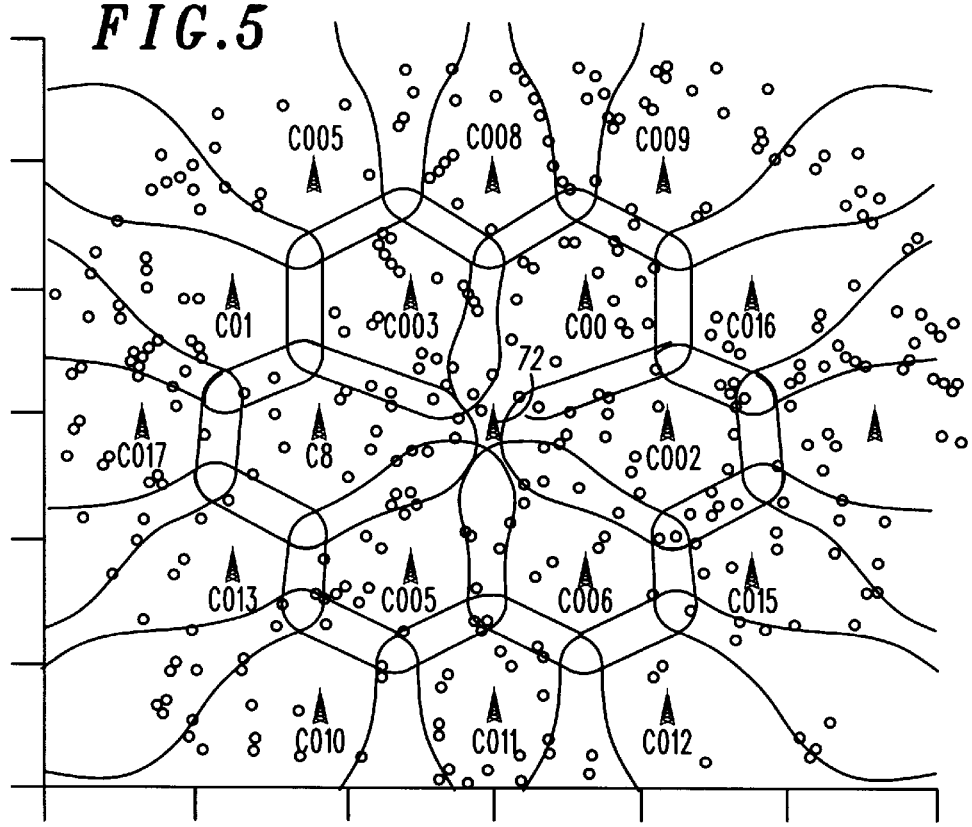
FIG. 5 is a schematic drawing of a direct sequence code division multiple access (DS-CDMA) cellular communication system where the transmitter of the center cell has failed.

There are two strategies for controlling power amplifiers 72 in a DS-CDMA cellular communication system, shown in FIG. 4. The first strategy is called the constant power strategy 90. The second strategy is called the power on demand strategy 92. The figure shows total PA power out 94 as the vertical axis. A dashed line 96 shows the maximum power output of the PA. In the constant power strategy 90, three components make up the total power used by the PA. The first group of power 98 is used by the pilot channel, paging channel and the synchronization channel. The second group 100 of power is used by the actual traffic channels in use. The third group 102 of power is used by dummy traffic channels. The idea behind powering the dummy traffic channels is to-provide "constant" cell boundaries. In the power on demand strategy 92, there is no power used up by dummy traffic channels. FIG. 5 shows the effect of switching from the constant power mode shown in FIG. 2 to the power on demand mode. As can be seen by examining the two figures, the coverage hole 22 shrinks, but still exists.

Figure 6:
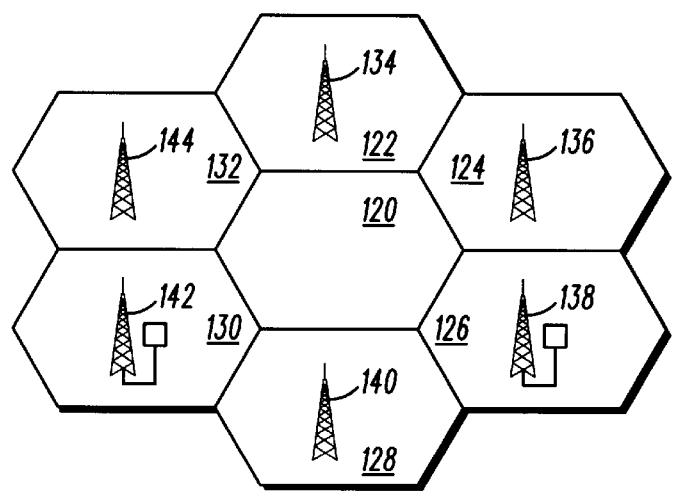
FIG. 6 is a schematic drawing of a cellular communication system.

FIG. 6 shows an idealized cellular communication system with the familiar hexagonal cells and transmitters in the center of the cells. A cell 120 is shown without a transmitter to denote that the transmitter in cell 120 has failed. A plurality of adjacent cells 122–132, having coverage areas adjacent to the failed transmitter's coverage area have transmitters (base sites, BTSs) 134–144. Cells 122 and 128 are consider to be opposite cells (BTSs 134 & 140 are opposite BTSs). It follows that cells 124 and 130 are opposite cells and cells 132 and 126 are opposite cells. Using these definitions, a solution, shown in FIG. 7, to providing communications services to a coverage gap can be explained. The process starts at block 200, where it is determined, by the OMC, that a transmitter has failed. The OMC then determines the set of adjacent cells to the cell with the failed transmitter and places all the adjacent cell's transmitter in the power on demand mode, at block 202. The adjacent cells are then grouped in opposite pairs at block 204. A combined interference level for each of the opposite pairs is determined and the opposite pair with the lowest combined interference level is selected, at block 206. The interference level is determined from the received signal strength indicator (RSSI) at the base sites. The interference level can be selected to be the mean of the RSSI or the variance or some other statistical measure derived from the RSSI. The RSSI is an indicator of the level of interference in a DS-CDMA because a DS-CDMA cellular communication system is a self-interference system. The channels in DS-CDMA system share the same frequency spectrum. At step 208, the power to the pilot channels of the selected opposite pair of transmitters is increased by 3 dB. The process described in FIG. 7, shifts the mobiles in the coverage hole to the two cells having the best reception and therefore the cells best able to accommodate more users. This process is able to provide communication service to the coverage hole because only a selected number of transmitters (cells) increase their pilot channel power. Increasing the pilot channel's power increases the cell's range. The pilot channel is the channel a mobile looks for from the base site to determine if the base site is available for communication.

Figure 8:
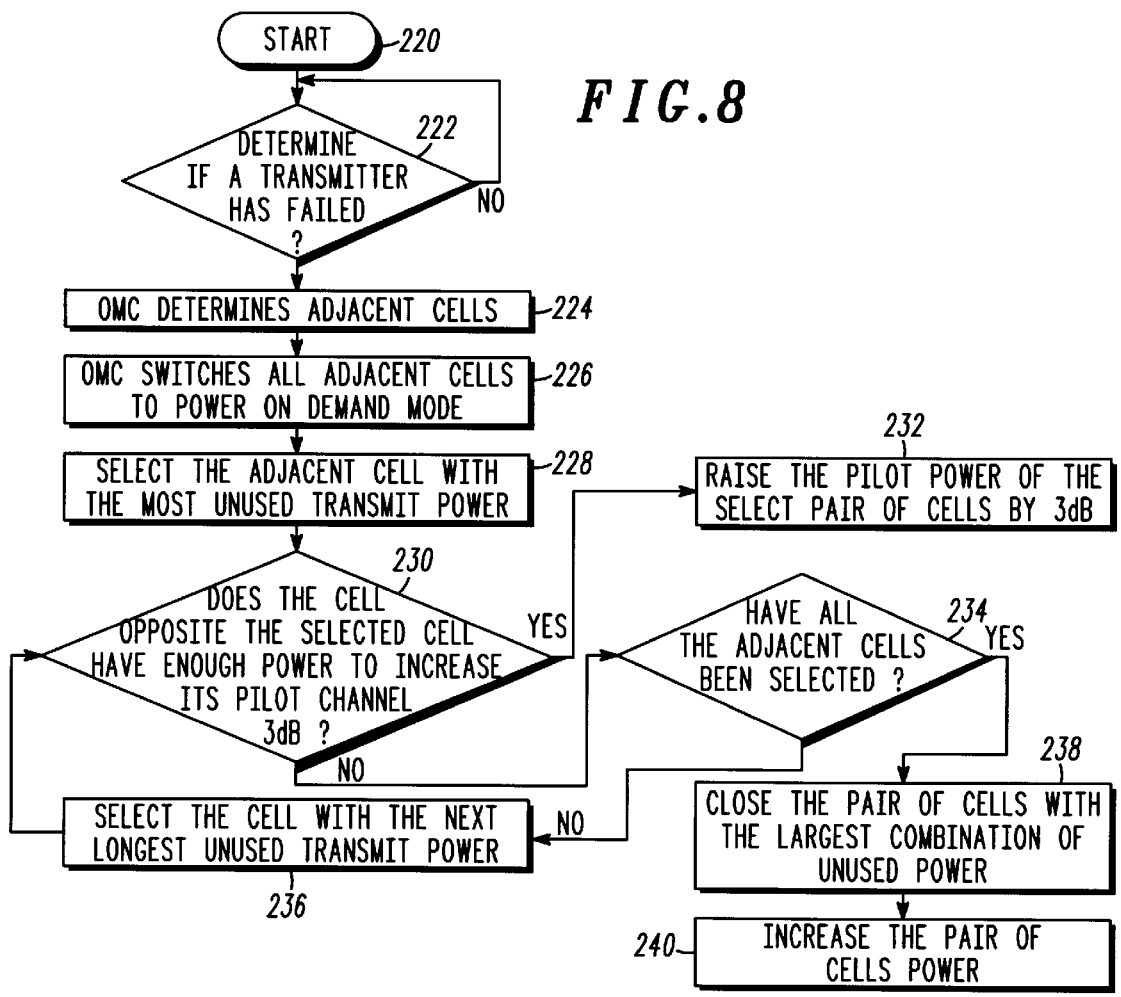
FIG. 8 is a flow diagram of another method for providing communication services to a coverage hole.

FIG. 8 is an alternative process for selecting a pair of opposite transmitters to fill the coverage gap. The process selects the adjacent transmitter with the largest amount of unused PA power. If the opposite transmitter has sufficient unused power to increase its pilot power 3 dB, this pair of transmitters is chosen to fill the coverage gap. The process starts at block 220. The process waits at block 222, until it is determined if a transmitter has failed. The OMC then determines all the cells adjacent to the cell in which the transmitter has failed, at block 224. The OMC switches any of the adjacent cells in the constant power mode to the power on demand mode, at block 226. Next, the OMC selects the adjacent cell (transmitter) with the most unused transmitter power, at block 228. The OMC then determines if the cell opposite the selected cell has enough power to increase its pilot channel by 3 dB, at block 230. When the opposite cell does have sufficient power to raise its pilot channel by 3 dB, then the selected pair of transmitters increase the power to their pilot channels by 3 dB, at block 232. When the opposite cell does not have sufficient power to raise its pilot channel by 3 dB, then the OMC determines if all the adjacent cells have been selected at block 234. When not all the cells have been selected at block 234, the OMC selects the cell with the next largest unused transmit power at block 236. Processing then continues at block 230. When all the adjacent cells have been selected at block 234, the OMC chooses the pair of cells with the largest combination of unused power at block 238. This pair of selected transmitters then increases their power to their pilot channels, at block 240.

Figure 7:
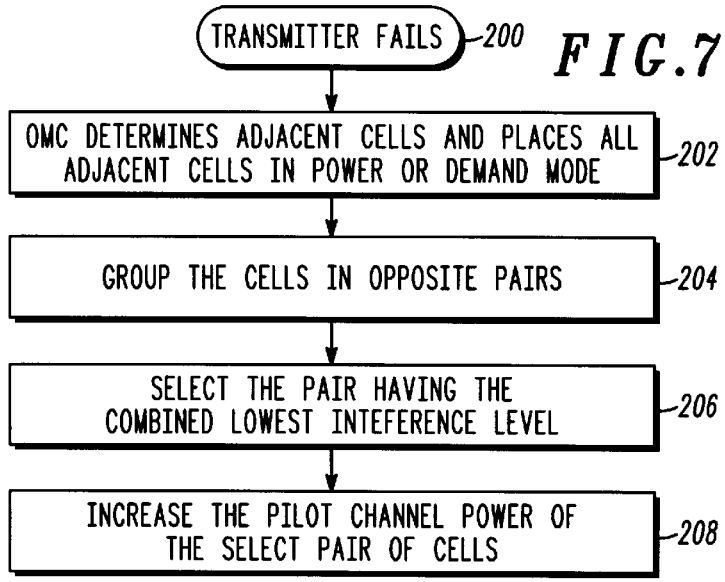
FIG. 7 is a flow diagram of a method for providing communication services to a coverage hole.
Figure 9:
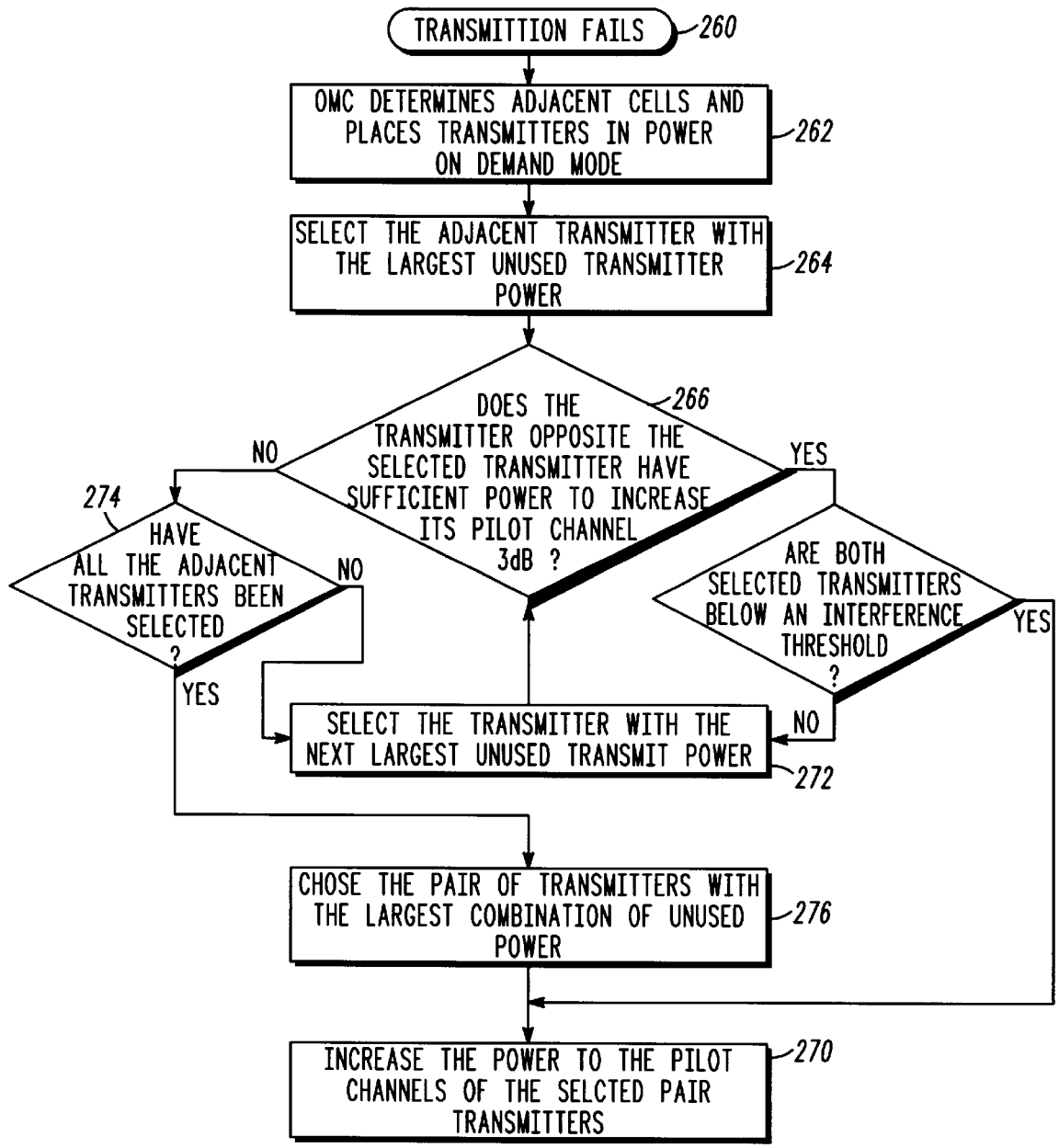
FIG. 9 is a flow diagram of another method for providing communication services to a coverage hole.

A third alternative process is shown in FIG. 9 and incorporates parts of both the process of FIG. 8 and FIG. 7. Once a transmitter fails at block 260, the OMC determines the adjacent cells and places the transmitters in a power on demand mode at block 262. Next, the adjacent transmitter with the largest quantity of unused transmitter power is selected at block 264. The OMC then determines if the transmitter opposite the selected transmitter has sufficient power to increase its pilot channel 3 dB, at block 266. When the transmitter opposite the selected transmitter has sufficient power to increase its pilot channel 3 dB, the OMC determines if both the selected and the opposite transmitter has interference levels below a predetermined threshold, at block 268. When both the selected and the opposite transmitter has interference levels below a predetermined threshold, then the selected and opposite transmitters increase their pilot channel power by 3 dB, at block 270. When either the selected or the opposite transmitter has interference levels above (or equal to) a predetermined threshold, then the OMC selects the transmitter with the next largest unused transmitter power, at block 272. Processing would then return to block 266. When the transmitter opposite the selected transmitter does not have the power to increase its pilot channel 3 dB, then the OMC determines if all the adjacent transmitters have been selected at block 274. When all the adjacent transmitters have not been selected at block 274, then processing continues at block 272. When all the adjacent transmitters have been selected at block 274, the OMC chooses the pair of opposite transmitters with the largest combination of unused power at block 278. Processing then continues at block 270.

Figure 10:
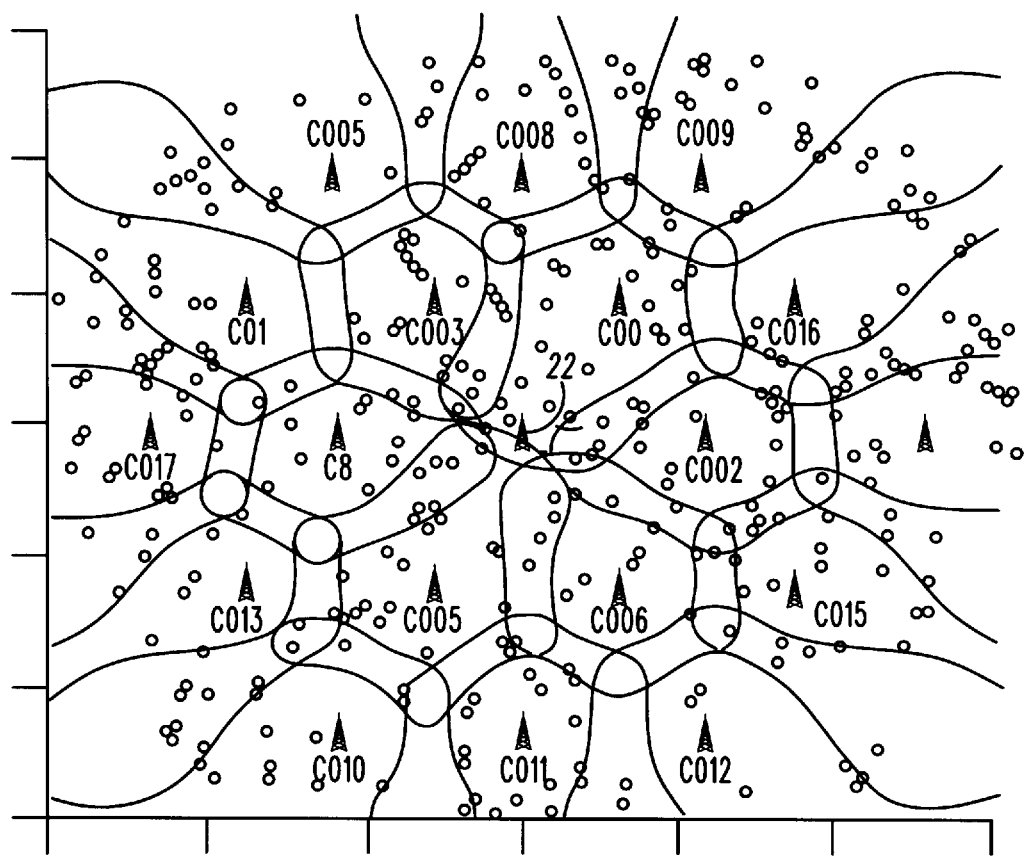
FIG. 10 is schematic drawing of a direct sequence code division multiple access (DS-CDMA) cellular communication system where the transmitter of the center cell has failed.

FIG. 10 is simulation of the process of FIG. 9. As can be seen from the figure, the coverage hole 22 that was evident in FIGS. 2 and 5 has been covered. Thus the invention supplies a method and system for providing communication to a coverage hole in a DS-CDMA cellular communication system. The invention allows a cellular operator is reduce both its initial capital investment and the on going maintenance cost by eliminating the need for duplicate transmitters and power amplifiers.

While the invention has been described in conjunction with specific embodiments thereof, it is evident that many alternatives, modifications, and variations will be apparent to those skilled in the art in light of the foregoing description. For instance, the invention has been described using omni directional transmitters, but could be easily modified to work with sectorized transmitters. Also the invention has been described in connection with a DS-CDMA cellular system, but could equally be applied to a frequency hopping or other spread spectrum cellular system. Accordingly, it is intended the invention embrace all such alternatives, modifications, and variations as fall within the spirit and broad scope of the appended claims.

What is claimed is:

1. A method of providing communication service to a coverage hole, comprising the steps of:

(a) determining a plurality of base sites having coverage areas adjacent to the coverage hole;

(b) placing a power amplifier associated with the plurality of base sites adjacent to the coverage hole in a power on demand mode;

(c) choosing a selected base site from one of the plurality of base sites having coverage areas adjacent to the coverage hole, based on a quantity of unused transmitter power in the selected base site;

(d) determining if an opposite base site has a sufficient quantity of unused transmitter power; and (e) when the opposite base site has the sufficient quantity of unused transmitter power increasing a pilot channel power to the selected base site and the opposite base site.

2. The method of claim 1, further including the steps of:

(f) when the opposite base site does not have the sufficient quantity of unused transmitter power choosing an alternative base site from one of the plurality of base sites having coverage areas adjacent to the coverage hole as the selected base site, based on a quantity of unused transmitter power in the alternative base site; and (g) repeating step (d).

3. The method of claim 1, wherein step (e) further including the steps of:

(e) when the opposite base site has the sufficient quantity of unused transmitter power and an interference level of both the selected and the opposite base sites are below a threshold, increasing the pilot channel power to the selected base site and the opposite base site.

4. The method of claim 3, further including the steps of:

(f) when the interference level of either of the selected and the opposite base sites are above the threshold, choosing an alternative base site from one of the plurality of base sites having coverage areas adjacent to the coverage hole, as the selected base site, based on a quantity of unused transmitter power in the alternative base site; and (g) repeating from step (d).

5. A cellular communication system capable of providing service to a coverage hole created by the failure of a transmitter, the system comprising:

a plurality of spread spectrum transmitters; and an operations and management center (OMC) coupled to a plurality of base sites and monitoring the plurality of base sites for failure of any of the plurality of spread spectrum transmitters wherein the OMC transmits a signal to switch any of a plurality of adjacent base sites in a constant power mode to a power on demand mode, the OMC further having means for determining a combined interference level at all of the plurality of adjacent base sites, and selecting the at least one of the plurality of spread spectrum transmitters from a list of the plurality of adjacent base sites having the combined interference level less than a threshold and transmits a signal to increase power to a pilot channel of selected base sites adjacent to the failed spread spectrum transmitter wherein a number of selected base sties is less than a number of base sties adjacent to the failed spread spectrum transmitter.

6. The cellular communication system of claim 5, wherein the selected base sites are determined before one of the plurality of spread spectrum transmitters fails.

7. The cellular communication system of claim 5, wherein the OMC determines the selected base sites to signal to increase power to the pilot channel based on a quantity of unused power capacity of a power amplifier.

8. The cellular communication system of claim 5, wherein the OMC ranks each of the base sites in the set of adjacent base sites according to unused power amplifier power and selects a base site in the set, based on the base sites ranking, to increase power to the pilot channel.

9. The cellular communication system of claim 5, wherein the OMC has means for determining a subset of the set of adjacent base sites that have combined interference levels below a threshold, and increasing the power to the pilot channel of at least one of the subset of the set of adjacent base sites.

* * * * *